(12) United States Patent
Koripella et al.

(10) Patent No.: US 6,387,559 B1
(45) Date of Patent: May 14, 2002

(54) DIRECT METHANOL FUEL CELL SYSTEM AND METHOD OF FABRICATION

(75) Inventors: Chowdary Ramesh Koripella, Scottsdale; William J. Ooms, Chandler; David L. Wilcox, Chandler; Joseph W. Bostaph, Chandler, all of AZ (US)

(73) Assignee: Motorola, Inc., Schaumburg, IL (US)

( * ) Notice: Subject to any disclaimer, the term of this patent is extended or adjusted under 35 U.S.C. 154(b) by 53 days.

(21) Appl. No.: 09/618,399

(22) Filed: Jul. 18, 2000

(51) Int. Cl.[7] .................................................. H01M 8/04
(52) U.S. Cl. .............................. 429/34; 429/30; 429/22; 429/33
(58) Field of Search ............................. 429/34, 30, 33, 429/19, 22

(56) References Cited

U.S. PATENT DOCUMENTS 3,840,405 A * 10/1974 Poirier D'Ange d'Orsay
5,770,326 A * 6/1998 Limaye ........................ 429/30
5,786,105 A * 7/1998 Matsushima et al. ......... 429/34

* cited by examiner

Primary Examiner—John S. Maples
(74) Attorney, Agent, or Firm—William E. Koch

(57) ABSTRACT

A fuel cell system and method of forming the fuel cell system including a base portion, formed of a singular body, and having a major surface. At least one fuel cell membrane electrode assembly is formed on the major surface of the base portion. A fluid supply channel including a mixing chamber is defined in the base portion and communicating with the fuel cell membrane electrode assembly for supplying a fuel-bearing fluid to the membrane electrode assembly. An exhaust channel including a water recovery and recirculation system is defined in the base portion and communicating with the membrane electrode assembly. The membrane electrode assembly and the cooperating fluid supply channel and cooperating exhaust channel forming a single fuel cell assembly.

20 Claims, 3 Drawing Sheets

DIRECT METHANOL FUEL CELL SYSTEM AND METHOD OF FABRICATION

FIELD OF INVENTION

The present invention pertains to fuel cells, and more particularly to a direct methanol fuel cell system and a method of fabricating the system, in which electrical energy is produced through the consumption of gaseous or liquid fuels.

BACKGROUND OF THE INVENTION

Fuel cells in general, are "battery replacements", and like batteries, produce electricity through an electrochemical process without combustion. The electrochemical process utilized provides for the combining of hydrogen protons with oxygen from the air. The process is accomplished utilizing a proton exchange membrane (PEM) sandwiched between two electrodes, namely an anode and a cathode. Fuel cells, as known, are a perpetual provider of electricity. Hydrogen is typically used as the fuel for producing the electricity and can be processed from methanol, natural gas, petroleum, or stored as pure hydrogen. Direct methanol fuel cells (DMFCs) utilize methanol, in a gaseous or liquid form as fuel, thus eliminating the need for expensive reforming operations. DMFCs provide for a simpler PEM cell system, lower weight, streamlined production, and thus lower costs.

In a standard DMFC, a dilute aqueous solution of methanol is fed as the fuel on the anode side (first electrode) and the cathode side (second electrode) is exposed to forced or ambient air (or O2). A nafion type proton conducting membrane typically separates the anode and the cathode sides. Several of these fuel cells can be connected in series or parallel depending on the power requirements.

Typically DMFCs designs are large stacks with forced airflow at elevated temperatures. Smaller air breathing DMFC designs are more complicated. In conventional PEM fuel cells, stack connections are made between the fuels cell assemblies with conductive plates, machined with channels or grooves for gas distribution. A typical conventional fuel cell is comprised of an anode ($H_2$ or methanol side) current collector, anode backing, membrane electrode assembly (MEA) (anode/ion conducting membrane/cathode), cathode backing, and cathode current collector. Each fuel cell is capable of approx. 1.0 V. To obtain higher voltages, fuel cells are typically stacked in series (bi-polar manor—positive to negative) one on top another. Conventional fuel cells can also be stacked in parallel (positive to positive) to obtain higher power, but typically, larger fuel cells are simply used.

During operation of a direct methanol fuel cell, a dilute aqueous methanol (usually 3–46 methanol) solution is used as the fuel on the anode side. If the methanol concentration is too high, then there is a methanol crossover problem that will reduce the efficiency of the fuel cell. If the methanol concentration is too low then there will not be enough fuel on the anode side for the fuel cell reaction. Current DMFC designs are for larger stacks with forced airflow. The smaller air breathing DMFC designs are difficult to accomplish because of the complexity in miniaturizing the system for portable applications. For portable applications carrying the fuel in the form of a very dilute methanol mixture would require carrying a large quantity of fuel which is not practical for the design of a miniature power source for portable applications. Miniaturizing the DMFC system requires carrying methanol and water separately and mixing them in-situ for the fuel cell reaction. Recirculation of the water fuel mixture after the fuel cell reaction and recycling of the water generated in the fuel cell reaction, in addition to the water diffused across the membrane is also required for miniaturizing the system.

Accordingly, it is a purpose of the present invention to provide for a direct methanol fuel cell system design in which at least one direct methanol fuel cell is integrated into a miniaturized system.

It is a purpose of the present invention to provide for a direct methanol fuel cell system including microchannels and cavities and microfluidics technology for fuel-bearing fluid mixing, pumping and recirculation.

It is a further purpose of the present invention to provide for a direct methanol fuel cell system which is orientation insensitive.

It is still a further purpose of the present invention to provide for a direct methanol fuel cell system in which all of the system components are embedded inside a base portion, such as a ceramic base portion.

It is yet a further purpose of the present invention to provide for method of fabricating a direct methanol fuel cell system which includes the steps of providing for microchannels and cavities in which microfluidic technology is a basis for the mixing, pumping and recirculation of a fuel-bearing fluid.

SUMMARY OF THE INVENTION

The above problems and others are at least partially solved and the above purposes and others are realized in a fuel cell array apparatus and method of forming the fuel cell array apparatus including a base portion, formed of a singular body, and having a major surface. At least one membrane electrode assembly formed on the major surface of the base portion. A fluid supply channel is defined in the base portion and communicating with the at least one membrane electrode assembly for supplying a fuel-bearing fluid to the at least one membrane electrode assembly. An exhaust channel is defined in the base portion and communicating with the at least one membrane electrode assembly. The exhaust channel is spaced apart from the fluid supply channel for exhausting fluid from the at least one membrane electrode assembly. The membrane electrode assembly and the cooperating fluid supply channel and cooperating exhaust channel forming a single fuel cell assembly. There is additionally included a top portion which includes a plurality of electrical components for electrical integration of a plurality of formed fuel cell assemblies.

BRIEF DESCRIPTION OF THE DRAWINGS

Referring to the drawings.

DESCRIPTION OF THE PREFERRED EMBODIMENT

Figure 1:
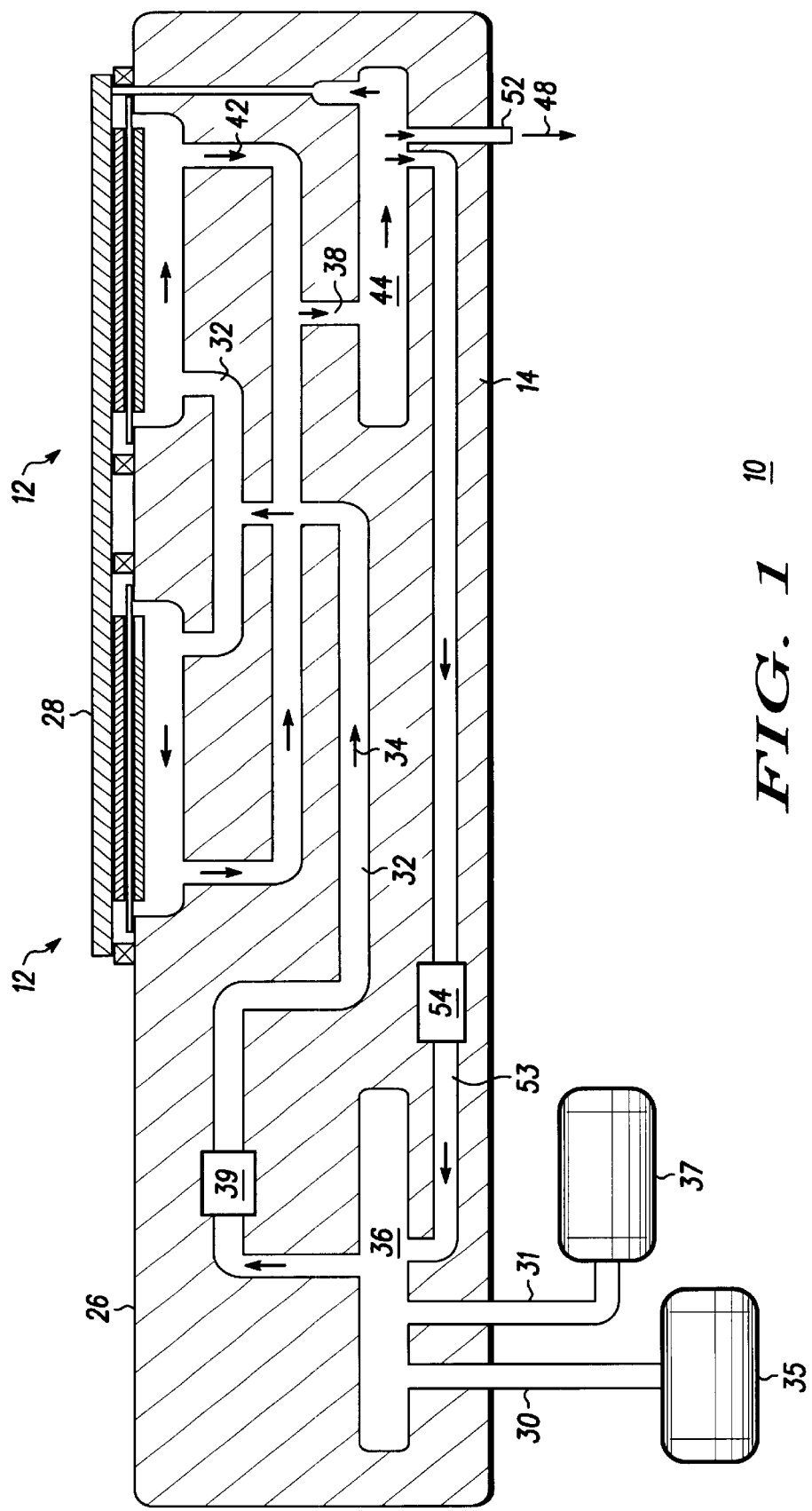
FIG. 1 is a simplified sectional view of a plurality of direct methanol fuel cell devices formed on a single base portion including a plurality of microfluidic channels, according to the present invention.
Figure 2:
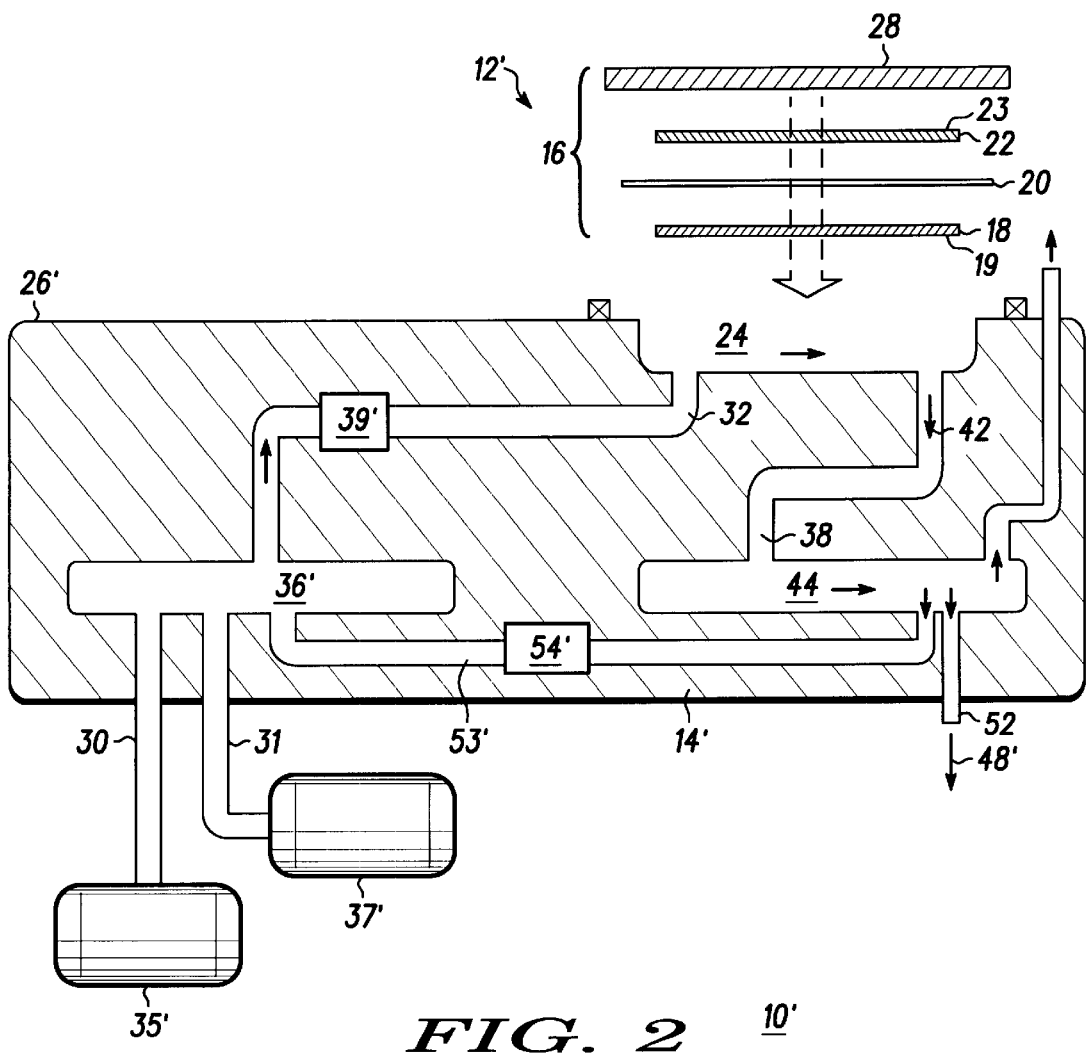
FIG. 2 is a simplified sectional view of a single direct methanol fuel cell device formed on a single base portion including a plurality of microfluidic channels, according to the present invention.

Turning now to the drawings, FIG. 1 illustrates in simplified sectional view a planar array direct methanol fuel cell system fabricated according to the present invention. More particularly, there is formed a planar stack array 10, including two direct methanol fuel cells, generally referenced 12. Fuel cells 12 are formed on a base portion 14, each fuel cell 12 being spaced at least 1 mm apart from an adjacent fuel cell 12. It should be understood that dependent upon the required power output, any number of fuel cells 12 can be fabricated to form a planar array of fuel cells, from one fuel cell as illustrated in FIG. 2 (discussed presently), to numerous fuel cells. The material of base portion 14 is designed to be impermeable to the mixture of fuel and oxidizer materials that is utilized to power fuel cells 12. Typically a hydrogen-containing fuel/oxidizer mixture is utilized to power fuel cells 12. Suitable fuels that are consumed by fuel cells 12 to produce electrical energy are hydrogen-containing materials such as hydrogen, methane and methanol. In this particular example, methanol is used to fuel, cells 12. Base portion 14 is typically formed of glass, plastic, silicon, ceramic, or any other suitable material. In this particular embodiment, planar stack array 10 is composed of the at least two direct methanol fuel cells 12 each defined by a fuel cell membrane electrode assembly (MEA) (discussed presently FIG. 2), accordingly, planar stack array 10 includes two fuel cell membrane electrode assemblies.

Base portion 14 has formed within a plurality of microfluidic channels as illustrated. More particularly, base portion 14 has formed a first fluid inlet 30 and a second fluid inlet 31, in fluidic communication with a fluid supply channel 32. Fluid supply channel 32 is formed in base portion 14 utilizing standard techniques, well known in the art, such as multi-layer ceramic technology, micromachining, or injection molding. Fluid supply channel 32 supplies a fuel-bearing fluid 34 to each of the at least two spaced apart fuel cells12. In this particular example, fuel-bearing fluid 34 is comprised of methanol and water being delivered directly from a methanol tank 35 and a water tank 37. A mixing chamber 36 is formed in base portion 14 in micro-fluidic communication with fluid supply channel 32 as illustrated. In a preferred embodiment, fuel-bearing fluid 34 is 0.5%–4.0% methanol in water (96%–99.5%). The goal is to pump methanol into the overall assembly 10 at a rate of 0.002 ml/min and pump the water into the assembly 10 at a rate of 0.098 ml/min (2% to 980%). The fuel cell assembly 10 would also be able to use other fuels, such as hydrogen or ethanol, but it should be noted that ethanol is not as efficient, nor does it produce as much power as does the use of methanol. In this particular example a separate methanol tank 35 and water tank 37 are utilized to supply the fuel-bearing fluid 34. The methanol will be pumped in at a given rate, and the water will be added as needed determined by a methanol concentration sensor 39. Methanol concentration sensor 39 helps maintain the methanol ration in the mixture. The methanol and water will be homogeneously mixed in mixing chamber 36 before flowing to each individual fuel cell 12. It should be understood that fluid supply channel 32 provides for an equal and simultaneous delivery of fuel-bearing fluid 34 to each individually formed fuel cell 12.

In addition, there is formed in base portion 14, an exhaust channel 38 communicating with each of the at least two spaced apart fuel cells 12. Exhaust channel 38 serves to remove exhaust products 42 from fuel cells 12, namely carbon dioxide and a water/methanol mixture. During operation, exhaust products are separated in a carbon dioxide separation chamber 44 into the water/methanol mixture 46 and a carbon dioxide gas 48. Next, gas 48 is expelled through an exhaust outlet 52, such as a gas permeable membrane and water/methanol mixture 46 is recirculated through a recirculating channel 53, having included as a part thereof a pump 54, such as a MEMS pump, or check valve type assembly, back to mixing chamber 36. In addition, in microfluidic communication is a gas permeable water recovery system 56, and a water recovery return channel 58. Water recovery system 56 serves to recapture water from the cathode sides of fuel cells 12, and direct it toward water recovery return channel 58, as illustrated. Water recovery return channel 58 is in micro-fluidic communication with separation chamber 44 and ultimately mixing chamber 36.

Recirculation of the water/methanol mixture, subsequent to reaction in the fuel cell, and the recycling of the water diffused across the cathode, is required for miniaturizing the system. It is anticipated that the fuel delivery system includes methanol and water, in the form of methanol tank 35 and water tank 37, which is to be carried in portable disposable cartridge-like devices, connected through tubing to the base portion 14.

Fuel cell array 10 typically has formed as a part thereof, four individual fuel cells 12, having an overall base portion 14 dimension of approximately 5.5 cm×5.5 cm ×0.5 cm, and individual fuel cell 12 area of 4×1.5–2.0 cm squares. Each individual fuel cell 12 is capable of generating approximately 0.5 V and 22.5 mA/cm$^2$ of power.

Referring now to FIG. 2, illustrated is a fuel cell system, generally referenced 10' including a single fuel cell assembly 12'. It should be noted that all components of the first embodiment as illustrated in FIG. 1, that are similar to components of this particular embodiment as illustrated in FIG. 2, are designated with similar numbers, having a prime added to indicate the different embodiment. Fuel cell 12' is comprised of a fuel cell membrane electrode assembly 16 comprised of first electrode 18, including a carbon cloth backing 19, a film 20, such as a porous protonically conducting electrolyte membrane, and a second electrode 22, including a carbon cloth backing 23. First and second electrodes 18 and 22 are comprised of a material selected from the group consisting of platinum, palladium, gold, nickel, tungsten carbide, ruthenium, molybdenum, and alloys of platinum, palladium, gold, nickel, tungsten carbide, molybdenum, and ruthenium. Film 20 is further described as formed of a nafion type material that prevents the permeation of fuel from the anode side (first electrode 18) to the cathode side (second electrode 22) of fuel cell 12'.

Membrane electrode assembly 16 in this particular example is positioned in a recess 24 formed in an uppermost major surface 26 of base portion 14'. It is anticipated by this disclosure that membrane electrode assembly 16 can be positioned on major surface 26 of base portion 14' without the need for the formation of recess 24. In this instance, a spacer (not shown) would be utilized to avoid complete compression of membrane electrode assembly 16.

Planar stack array 10' further includes a top portion, more specifically, in this particular embodiment, a current collector 28 positioned to overlay membrane electrode assembly 16. Current collector 28 is disclosed in a preferred embodiment as being formed discretely over each individually formed fuel cell membrane electrode assembly 16. Current collector 28 is further described in a preferred embodiment as comprised of a perforated corrugated gold coated stainless steel. It should be understood that in addition it is anticipated that current collector 28 can be formed of any electrically conductive material.

During fabrication, individual fuel cell membrane electrode assemblies 16 are formed using a direct painting method or hot press method. More particularly, the plurality of first electrodes 18 are formed or positioned in contact with major surface 26 of base portion 14'. Various materials are suitable for the formation of electrodes 18. Suitable materials include platinum, palladium, gold, nickel, tungsten carbide, ruthenium, molybdenum and various alloys of these materials.

In this specific embodiment, and for exemplary purposes, each of the plurality of first electrodes 18 has a dimension of approximately 2.0 cm×2.0 cm. When planar stack 10' includes a plurality of fuel cells 12', such as that discussed previously with respect to FIG. 1, there is included a separation of approximately 0.5 mm to 1 mm between adjacent fuel cells 12.

Film 20, formed of a protonically conducting electrolyte, also referred to as a proton exchange membrane (PEM), is comprised of a nafion type material. Film 20 as previously stated serves to limit the permeation of fuel from the anode 18 of fuel cell 12 to the cathode 22 of fuel cell 12.

Next, during fabrication of membrane electrode assembly 16, a plurality of second electrodes 22 are formed to be correspondingly cooperating with the plurality of first electrodes 18. Each second electrode 22 is formed having approximately the same dimension as its corresponding first electrode 18. It should be understood, that as described, fuel cell membrane electrode assemblies 16 are each comprised of first electrode 18, film 20 and second electrode 22.

Finally, current collector 28 is positioned relative to second electrode 22. Current collector 28 is formed at least 0.1 mm thick and of a length dependent upon a point of contact on fuel cell 12'. In the alternative, when the device includes a plurality of fuel cells 12', the plurality of fuel cells 12' can be electrically interfaced using silver conducting paint deposited by evaporation or sputtering. Materials suitable for this are gold (Au), silver (Au), copper (Cu), or any other low electrical resistant material. The bulk resistivity of the electrode material and area of the electrode will dictate the type of current collection scheme to minimize ohmic losses. In addition, anticipated by this disclosure to achieve electrical interface between the plurality of direct methanol fuel cells 12', are patterned conductive epoxy and pressing, wire bonding, tab bonding, spring contacts, flex tape, or alligator clips. It should be understood, that it is anticipated that fuel cells 12' can be electrically interfaced utilizing either a series connection or a parallel connection, dependent upon the desired resultant voltage. To achieve electrical interfacing (not shown) of the plurality of fuel cells 12', each of the second electrodes 22 is electrically connected to an adjacent first electrode 18, thus connected in series electrical interface, to increase the output voltage of the fuel cell array apparatus 10' or each of the first electrodes 18 is electrically connected to an adjacent first electrode 18, and each of the second electrodes 22 is electrically connected to an adjacent second electrode 22, thus connected in parallel electrical interface, to increase the output voltage of the fuel cell array apparatus 10'.

Figure 3:
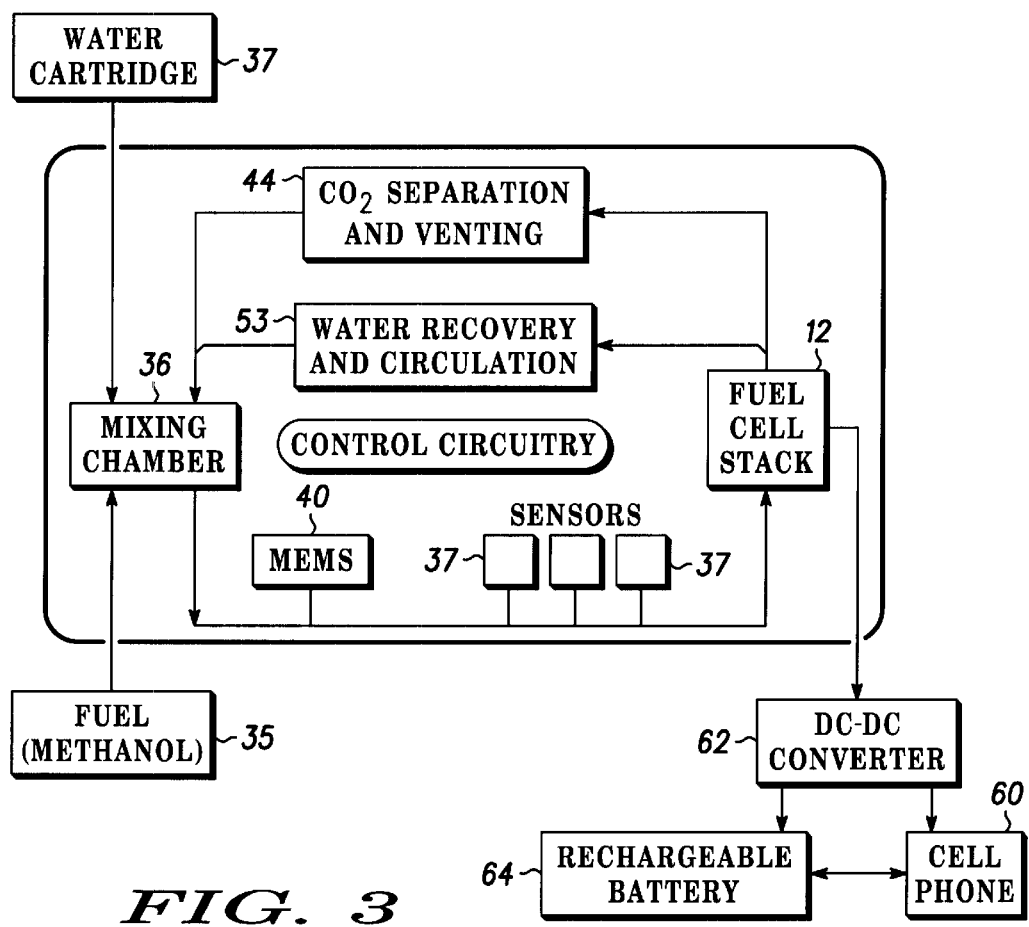
FIG. 3 is a simplified schematic diagram illustrating the system of the present invention.

Referring now to FIG. 3, illustrated is a simplified schematic diagram detailing the system of the present invention. Illustrated are methanol tank 35 and water tank 37 in microfluidic communication with mixing chamber 36. Mixing chamber 36 as previously discussed serves to achieve the proper ratio of methanol to water. Once properly mixed, the fuel-bearing fluid flows through the fluid supply channel toward the fuel cell 12. An optional MEMs type pump 40 is utilized to assist with this flow. Concentration sensors 39 are provided to assist with monitoring the methanol concentration, and the temperature of the fuel-bearing fluid.

The fuel-bearing fluid next reaches fuel cell stack 12 and generates power. The power is supplied to a DC—DC converter 62 which converts the generated voltage to a useable voltage for powering a portable electronic device, such as a cell phone 60 and included as a part thereof a rechargeable battery 64. During operation spent fluid is exhausted through the exhaust channel toward a carbon dioxide separation chamber and carbon dioxide vent, generally referenced 44. In addition, water is recovered from the cathode side of the fuel cell 12, and from the separation chamber 44 and is recirculated through a recirculating channel back to the mixing chamber 36. This recirculating of fluid provides for the consumption of less water from water tank 37 and thus less replenishment of water tank 37.

Accordingly, disclosed is a fuel cell system and method of fabrication which provides for the fabrication of the system, providing for inclusion of a single fuel cell or a plurality of fuel cells to be formed on a planar surface, thus allowing higher voltages and currents to be gained on a single planar surface. More particularly, the design provides for a simplified system in which spent fuel is partially separated to recirculate useable by-product, namely water, thereby providing for less consumption and replenishment of a water supply. In addition, it is disclosed that the system of the present invention is a semi-self contained system, and is not orientation sensitive, thus providing for ease in moving the system, such as when providing power to a portable electronic device.

While we have shown and described specific embodiments of the present invention, further modifications and improvements will occur to those skilled in the art. We desire it to be understood, therefore, that this invention is not limited to the particular forms shown and we intend in the appended claims to cover all modifications that do not depart from the spirit and scope of this invention.

What is claimed is:

1. A fuel cell system comprising:
   a base portion, formed of a singular body, and having a major surface;
   at least one fuel cell membrane electrode assembly formed on the major surface of the base portion;
   a fluid supply channel defined in the base portion and communicating with the at least one fuel cell membrane electrode assembly, the fluid supply channel including a mixing chamber and at least two fuel-bearing fluid inlets for the inlet of a fuel-beating fluid; and
   an exhaust channel defined in the base portion and communicating with the at least one fuel cell membrane electrode assembly, the exhaust channel including a water recovery and recirculation system, the exhaust channel spaced apart from the fluid supply channel for exhausting fluid from the at least one fuel cell membrane electrode assembly, the at least one fuel cell membrane electrode assembly and the cooperating fluid supply channel and cooperating exhaust channel forming a single fuel cell assembly.

2. A fuel cell system as claimed in claim 1 wherein the base portion comprises a material selected from the group consisting of ceramic, plastic, glass, and silicon.

3. A fuel cell system as claimed in claim 2 further wherein the at least one fuel cell membrane electrode assembly formed on the major surface of the base portion includes a plurality of fuel cell membrane electrode assemblies formed on the major surface of the base portion wherein each of the plurality of fuel cell membrane electrode assemblies is spaced at least 1 mm from an adjacent fuel cell membrane electrode assembly.

4. A fuel cell system as claimed in claim 1 wherein the fuel cell membrane electrode assembly includes a first electrode, a film adjacent the first electrode, formed of a protonically conductive electrolyte, and a second electrode in contact with the film.

5. A fuel cell system as claimed in claim 4 wherein the first and second electrodes comprise a material selected from the group consisting of platinum, palladium, gold, nickel, tungsten carbide, ruthenium, molybdenum, and alloys of platinum, palladium gold, nickel, tungsten carbide, molybdenum, and ruthenium.

6. A fuel cell system as claimed in claim 5 wherein the film adjacent the first electrode is comprised of a proton exchange type material.

7. A fuel cell system as claimed in claim 1 wherein (the fuel-bearing fluid) is comprised of mixture of methanol and water, supplied by a separate methanol source and a separate water source, and mixed in-situ.

8. A fuel cell system as claimed in claim 1 wherein the fluid supply channel defined in the base portion and communicating with the fuel cell membrane electrode assembly includes a methanol concentration sensor.

9. A fuel cell system as claimed in claim 1 wherein the exhaust channel defined in the base portion and communicating with the fuel cell membrane electrode assembly further includes a carbon dioxide separation chamber and a carbon dioxide exhaust vent.

10. A fuel cell system as claimed in claim 1 wherein the water recovery and recirculation system provides for the recovery and recirculation of a spent water and ethanol mixture from the fuel cell back to the mixing chamber.

11. A fuel cell array apparatus comprising:
  a base portion, formed of a singular body, and having a major surface, the base portion formed of a material selected from the group consisting of ceramic, plastic, glass, and silicon;
  at least one fuel cell membrane electrode assembly formed on the major surface of the base portion, the at least one fuel cell membrane electrode assembly including a first electrode, a film in contact with the first electrode and formed of a protonically conductive electrolyte, and a second electrode in contact with the film;
  a fluid supply channel defined in the base portion and communicating with the at least one fuel cell membrane electrode assembly for supplying a fuel-bearing fluid to the at least one fuel cell membrane electrode assembly, the fluid supply channel further including a first fuel-bearing fluid inlet, and a second fuel-bearing fluid inlet, and a mixing chamber;
  an exhaust channel defined in the base portion and communicating with the at least one fuel cell membrane electrode assembly, the exhaust channel spaced apart from the fluid supply channel for exhausting fluid from the at least one spaced apart fuel cell membrane electrode assembly, the exhaust channel further including a water recovery and recirculation assembly in fluidic communication with the send electrode of the at least one fuel cell membrane electrode assembly, in combination the at least one fuel cell membrane electrode assembly and the cooperating fluid supply channel and cooperating exhaust channel forming a single fuel cell assembly; and
  a top portion for electrical integration of a plurality of fuel cell membrane electrode assemblies.

12. A fuel cell array apparatus as claimed in claim 11 further including a plurality of spaced apart fuel cell membrane electrode assemblies formed on the major surface of the base portion, thereby forming a plurality of fuel cell assemblies.

13. A fuel cell array apparatus as claimed in claim 12 wherein the plurality of fuel cell membrane electrode assemblies are electrically connected in one of a series electrical interface or a parallel electrical interface.

14. A fuel cell array apparatus as claimed in claim 13 wherein the fluid supply channel defined in the base portion and the exhaust channel defined in the base portion are formed to equally and simultaneously communicate with each of the plurality of spaced apart fuel cell membrane electrode assemblies.

15. A fuel cell array apparatus as claimed in claim 11 wherein the first and second electrodes comprise a material selected from the group consisting of platinum, palladium, gold, nickel, tungsten carbide, molybdenum, ruthenium, and alloys of platinum, palladium, gold, nickel, tungsten carbide, molybdenum, and ruthenium.

16. A fuel cell array apparatus as claimed in claim 11 wherein the fluid supply channel defined in the base portion includes a methanol concentration sensor.

17. A fuel cell array apparatus as claimed in claim 11 wherein the exhaust channel defined in the base portion includes a carbon dioxide separation chamber and a carbon dioxide exhaust vent.

18. A method of fabricating a fuel cell array apparatus comprising the steps of:
  providing a base portion formed of a material selected from the group consisting of ceramic, plastic, glass, and silicon;
  forming a fluid supply channel in the base portion for supplying a fuel-bearing fluid to at least one fuel cell membrane electrode assembly, the fluid supply channel further including a mixing Her and a methanol concentration sensor;
  forming an exhaust channel in the base portion, the exhaust spaced apart from the fluid supply channel for exhausting fluid from the at least one spaced apart fuel cell membrane electrode assembly, the exhaust channel further including a water recovery and recirculation system for the recover and recirculation of a spent fuel-bearing fluid;
  forming the at least one fuel cell membrane electrode assembly on the major surface of the base portion, the step of forming the at least one spaced apart fuel cell membrane electrode assembly including the steps of providing for a first electrode on a major surface of the base portion, providing for a film in contact with the first electrode and formed of a protonically conductive electrolyte, and providing for a second electrode in contact with the film the at least one spaced apart fuel cell membrane electrode assembly and the cooperating fluid supply channel and cooperating exhaust channel forming a single fuel cell assembly; and
  forming a top portion for electrical integration of a plurality of fuel cell membrane electrode assemblies.

19. A method of fabricating a fuel cell array apparatus as claimed in claim 18 wherein the step of forming the at least one fuel cell membrane electrode assembly on the major surface of the base portion includes the step of forming a plurality of fuel cell membrane electrode assemblies.

20. A method of fabricating a fuel cell array apparatus as claimed in claim 18 further including the step of electrically interfacing the plurality of fuel cell membrane electrode assemblies including one of the steps of electrically connecting each of the second electrodes to an adjacent first electrode, thus connecting the plurality of fuel cells in series electrically to increase the output voltage of the structure or electrically connecting each of the first electrodes to an adjacent first electrode and connecting each of the second electrodes to an adjacent second electrode, thus connected in parallel electrically to increase tie output current.

* * * * *